US012296781B2

(12) United States Patent
Freisler

(10) Patent No.: US 12,296,781 B2
(45) Date of Patent: May 13, 2025

(54) HOLDING DEVICE AND AIRBAG MODULE

(71) Applicant: ZF AUTOMOTIVE GERMANY GMBH, Alfdorf (DE)

(72) Inventor: Werner Freisler, Schwabisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/558,545

(22) PCT Filed: May 2, 2022

(86) PCT No.: PCT/EP2022/061709
§ 371 (c)(1),
(2) Date: Nov. 2, 2023

(87) PCT Pub. No.: WO2022/233784
PCT Pub. Date: Nov. 10, 2022

(65) Prior Publication Data
US 2024/0239295 A1    Jul. 18, 2024

(30) Foreign Application Priority Data

May 4, 2021   (DE) .................. 10 2021 111 512.4

(51) Int. Cl.
*B60R 21/2338* (2011.01)
*F42B 3/00* (2006.01)
(52) U.S. Cl.
CPC .......... *B60R 21/2338* (2013.01); *F42B 3/006* (2013.01); *B60R 2021/23388* (2013.01)
(58) Field of Classification Search
CPC ...... B60R 21/2338; B60R 2021/23382; B60R 2021/23386; B60R 22/18
(Continued)

(56) References Cited

U.S. PATENT DOCUMENTS 7,490,854 B2 *  2/2009  Thomas .............. B60R 21/2338
                                                280/739
7,591,482 B2 *  9/2009  Thomas .............. B60R 21/2338
                                                280/739
(Continued)

FOREIGN PATENT DOCUMENTS

WO    2012/129467 A1    9/2012

*Primary Examiner* — Paul N Dickson
*Assistant Examiner* — Caitlin Anne Miller
(74) *Attorney, Agent, or Firm* — Tarolli, Sundheim, Covell & Tummino LLP

(57) ABSTRACT

The invention describes a holding device (12) for holding and releasing a tensioning means (14) of a vehicle safety system. The holding device (12) includes a pyrotechnical actuator assembly (24) for holding and, in terms of signals, specifically releasing the tensioning means (14), wherein the actuator assembly (24) comprises a plastic base (26) in which a pyrotechnical unit (28) including a propelling charge and an igniter (30) is accommodated and held, wherein the pyrotechnical unit (28) has a rear side (36) and an opposite front side (38), and a tensioning means holder (40) which is adjacent to the front side (38) of the pyrotechnical unit (28) and covers the same and which is detachably supported on the plastic base (26). The holding device (12) additionally includes a reinforcing element (58) which is supported to be axially movable between a first position and a second position, wherein the reinforcing element (58) in a second position is disengaged from the tensioning means holder (40) and in a first position is at least partially accommodated in the tensioning means holder (40) and mechanically reinforces the same. Furthermore, an airbag module (10) is described.

12 Claims, 4 Drawing Sheets

(58) Field of Classification Search
USPC .......................................... 280/743.2, 728.2
See application file for complete search history.

(56) References Cited

U.S. PATENT DOCUMENTS

| | | | | |
|---|---|---|---|---|
| 8,408,585 | B2* | 4/2013 | Paxton | ................ B60R 21/2338 |
| | | | | 280/743.2 |
| 8,602,453 | B1* | 12/2013 | Stevens | ................ B60R 21/217 |
| | | | | 280/743.2 |
| 10,336,284 | B2* | 7/2019 | Dry | .................... B60R 21/2334 |
| 2006/0192370 | A1 | 8/2006 | Abe et al. | |
| 2006/0290118 | A1 | 12/2006 | Thomas | |
| 2012/0242068 | A1* | 9/2012 | Paxton | ................ B60R 21/2338 |
| | | | | 280/743.2 |
| 2012/0242070 | A1 | 9/2012 | Paxton et al. | |

\* cited by examiner ized from this application filed under 35 USC 371, claiming priority to Serial No. PCT/EP2022/061709, filed on 2 May 2022; which claims priority from German Patent Application DE 10 2021 111 512.4, filed 4 May 2021, the entireties of which are hereby incorporated herein by reference.

HOLDING DEVICE AND AIRBAG MODULE

RELATED APPLICATIONS

This application is a U.S. National Stage Application filed under 35 USC 371, claiming priority to Serial No. PCT/EP2022/061709, filed on 2 May 2022; which claims priority from German Patent Application DE 10 2021 111 512.4, filed 4 May 2021, the entireties of which are hereby incorporated herein by reference.

TECHNICAL FIELD

The invention relates to a holding device for holding and releasing a tensioning means of a vehicle safety system, specifically a tether of an airbag of a vehicle safety system, as well as to an airbag module comprising a holding device.

BACKGROUND

Airbags are constituents of vehicle safety systems. Frequently, a tensioning means is fastened to an airbag. The tensioning means can help control the deployment of the airbag by releasing the tensioning means, for example, after the airbag has been filled at least partly with a gas. In this way, a desired deployment behavior of the airbag can be achieved.

In addition, the tensioning means can prevent the airbag in the inflated state from deploying excessively far in a particular direction. This function is applied, for example, to adaptive airbag concepts or to an active airbag venting. In piloted driving which gains in increasingly more importance, a vehicle occupant can take different positions such as a sitting position, when e/she is driving him-/herself, or a reclined position, when the vehicle is driving on autopilot. When the vehicle occupant is in a reclined position, the airbag must deploy, in the case of need, significantly farther towards the vehicle occupant than when the vehicle occupant is in a sitting position and, thus, is closer to the steering wheel. Hence, when the vehicle occupant is in a sitting position, the tensioning means restricts how far the airbag deploys toward the driver. Since the airbag has the tendency to deploy completely, high forces act on the tensioning means.

SUMMARY

Consequently, it is an object of the present invention to state a holding device for a tensioning means which can absorb high forces and still reliably releases the tensioning means in the case of need.

This object is achieved, according to the invention, by a holding device for holding and releasing a tensioning means of a vehicle safety system, specifically a tether of an airbag of a vehicle safety system, comprising a pyrotechnical actuator assembly for holding and, in terms of signals, specifically releasing the tensioning means. The actuator assembly comprises a plastic base in which a pyrotechnical unit including a propelling charge and an igniter is accommodated and held, the pyrotechnical unit having a rear side and an opposite front side, and a tensioning means holder which is adjacent to the front side of the pyrotechnical unit and covers the same and which is detachably supported on the plastic base. The actuator assembly additionally comprises a reinforcing element which is supported to be axially movable between a first position and a second position, wherein the reinforcing element in a second position is disengaged from the tensioning means holder and in a first position is received at least partially in the tensioning means holder and mechanically reinforces the latter.

The holding device can be designed, by the reinforcing element, for particularly high transverse forces, in particular for transverse forces greater than 2.5 kN, preferably greater than 5 kN.

In accordance with the invention, the reinforcing element helps reinforce a basic variant of the actuator assembly. The holding device according to the invention is thus suited in particular for the use in small and test series, as the plastic base and the tensioning means holder need not be adapted as compared to a basic variant. Therefore, this is advantageous as the development of new components as well as the manufacture of tool molds is complex and expensive and is not worthwhile for small quantities.

The reinforcing element is movable along a longitudinal axis of the holding device, for example.

On an end face facing away from the plastic base, the tensioning means holder preferably has a recess in which the reinforcing element is at least partially received positively and/or frictionally in its first position. Thus, the tensioning means holder bears on the reinforcing element when a transverse force is applied to the tensioning means holder. The tensioning means holder is thus reinforced particularly efficiently by the reinforcing element.

According to one embodiment, the holding device has a fixed bearing which is arranged spaced apart from the tensioning means holder, and the reinforcing element is received to be axially movable in the fixed bearing. Hence, the reinforcing element can be displaced particularly easily from the second position into the first position. In addition, the reinforcing element is already held on the holding device by means of the bearing as long as the reinforcing element is in the second position and, thus, not yet engaged in the tensioning means holder.

The reinforcing element is oriented by the bearing already specifically in such a way that the reinforcing element hits the recess in the tensioning means holder when it is displaced from the second position into the first position.

According to an embodiment, the reinforcing element includes a stop arranged spaced apart from the ends of the reinforcing element and the reinforcing element is adjacent to the bearing with the stop in its second position. As a consequence, starting from its second position the reinforcing element can be displaced only in the direction of the first position. The stop thus ensures that, starting from the second position, the reinforcing element cannot move in a direction away from the first position and is consequently captively held in the holding device.

Preferably, the bearing has a recess facing the tensioning means holder for receiving the tensioning means holder. The bearing thus serves, after triggering the holding device, as a catching device for the tensioning means holder detached from the plastic base.

The reinforcing element is held frictionally in the bearing, for example. The frictional engagement is particularly designed so that the reinforcing element cannot slip inadvertently but can be displaced from the second position into the first position relatively easily by the application of force. In particular, the reinforcing element can be manually displaced.

According to another embodiment, the reinforcing element can be tightly fixed to a linearly movable bearing part. The bearing part thus moves along with the reinforcing element from the second position to the first position. In this way, the reinforcing element is supported to be particularly stable.

The movable bearing part is frictionally guided in a linear guide, for example. Accordingly, the bearing part can be displaced particularly easily.

Preferably, there is provided a stop element delimiting displacement of the bearing part in a direction away from the plastic base. Hence, the displacement of the bearing part is carried out within a defined range.

The reinforcing element is an oblong ram, for example. Accordingly, the reinforcing element is easy to manufacture. In addition, an oblong ram can be easily supported to be linearly movable.

The reinforcing element may be made of plastic material or of metal.

The object is further achieved, according to the invention, by an airbag module for a vehicle safety system comprising an airbag, an airbag case in which the airbag is accommodated, a holding device which is configured as described before and is fastened to the airbag case, and comprising a tensioning means which is fastened to the airbag and is held on the holding device. The tensioning means thus can delimit deployment of the airbag as long as it is held on the holding device.

In order to hold the tensioning means on the holding device in an as simple manner as possible, a loop is formed at one end portion of the tensioning means which is not fastened to the airbag, the loop being laid around the tensioning means holder, specifically around the holding portion of the tensioning means holder, in the non-triggered state of the holding device.

BRIEF DESCRIPTION OF THE DRAWINGS

Further advantages and features of the invention will be evident from the following description and from the drawings which are referred to, and wherein.

DRAWINGS

Figure 1:
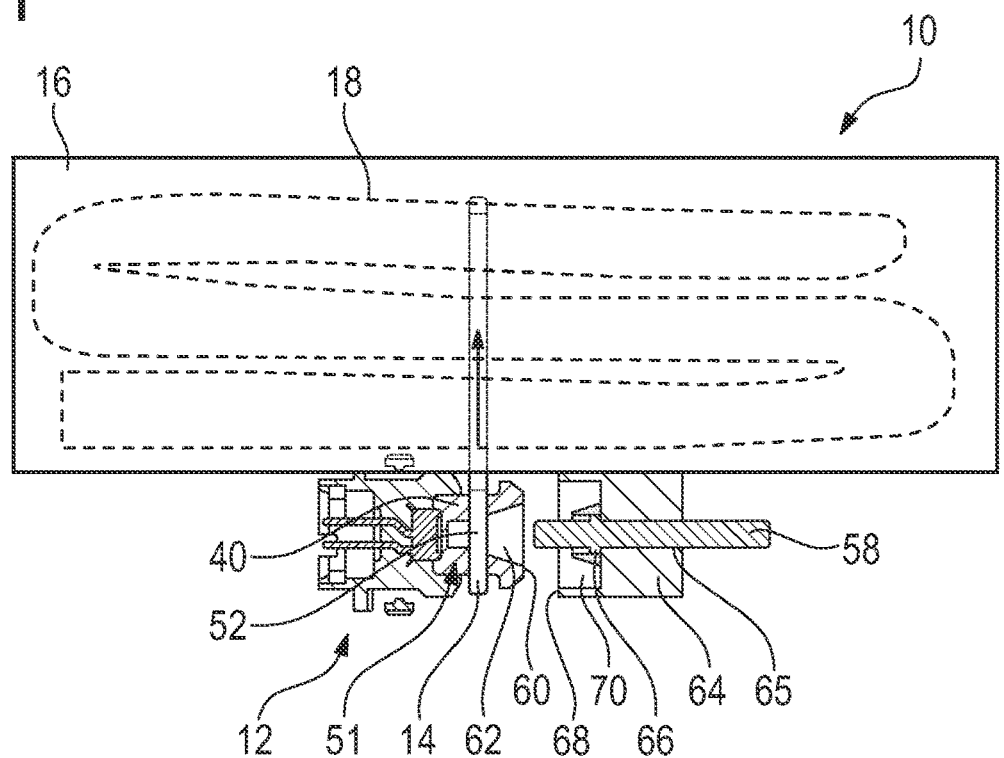
FIG. 1 shows an airbag module according to the invention comprising a holding device according to the invention in a non-triggered unreinforced state.

FIG. 1 illustrates an airbag module 10 comprising a holding device 12 for holding and releasing a tensioning means 14 of a vehicle safety system, specifically a tether.

In addition to the holding device 12, the airbag module 10 comprises an airbag case 16 and an airbag 18, the airbag 18 being accommodated folded in the airbag case 16 in the non-triggered state of the airbag module 10.

The tensioning means 14 is fastened to the airbag 18 and is held on the holding device 12 when the holding device 12 is in a non-triggered state, as illustrated in FIG. 1. In this way, the tensioning means 14 can restrict unfolding of the airbag 18.

Figure 2:
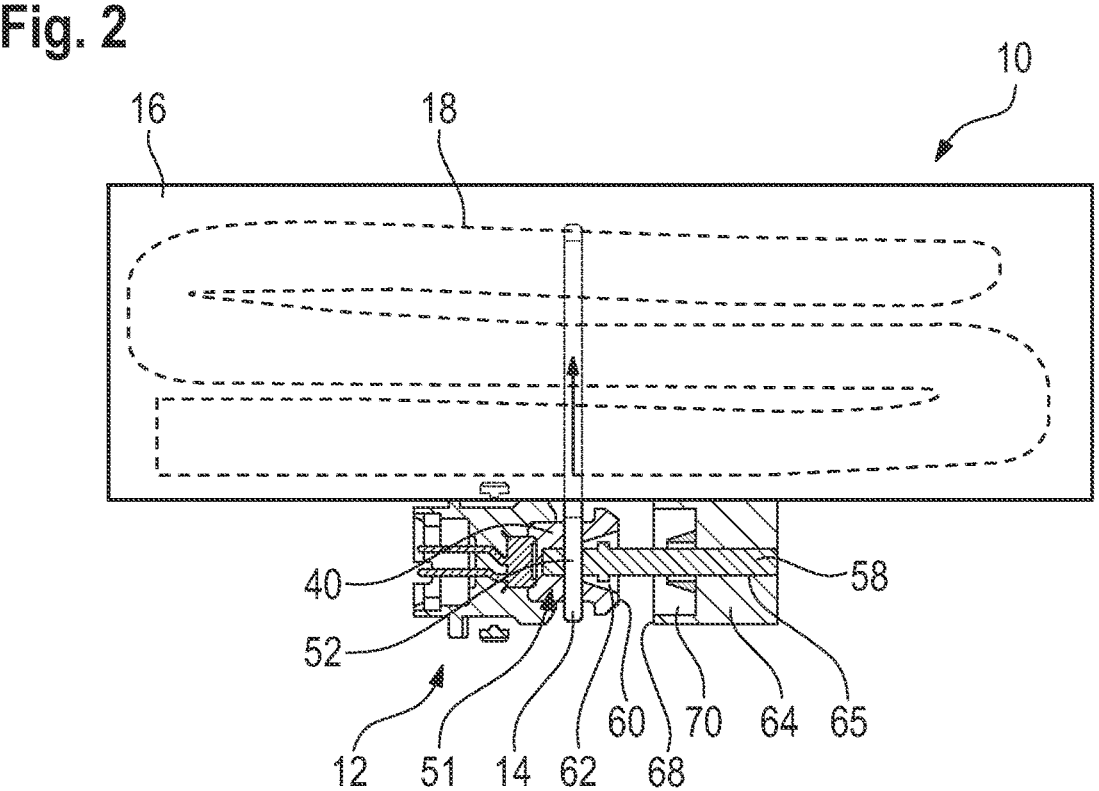
FIG. 2 shows the airbag module of FIG. 1, with the holding device being in a non-triggered reinforced state.
Figure 3:
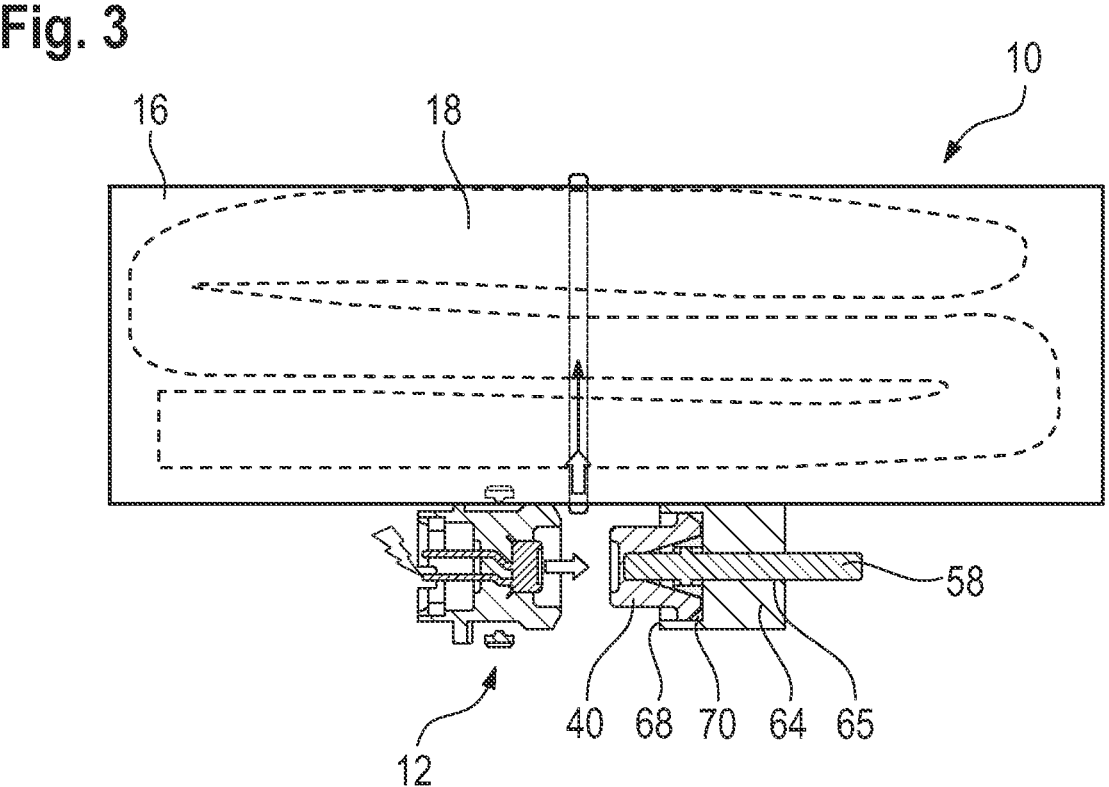
FIG. 3 shows the airbag module of FIGS. 1 and 2, with the holding device being triggered.

FIG. 3 illustrates the airbag module 10 of FIGS. 1 and 2 in a state in which the holding device 12 is triggered and, thus, the tensioning means 14 is released. In this case, the airbag 18 can freely deploy.

Figure 4:
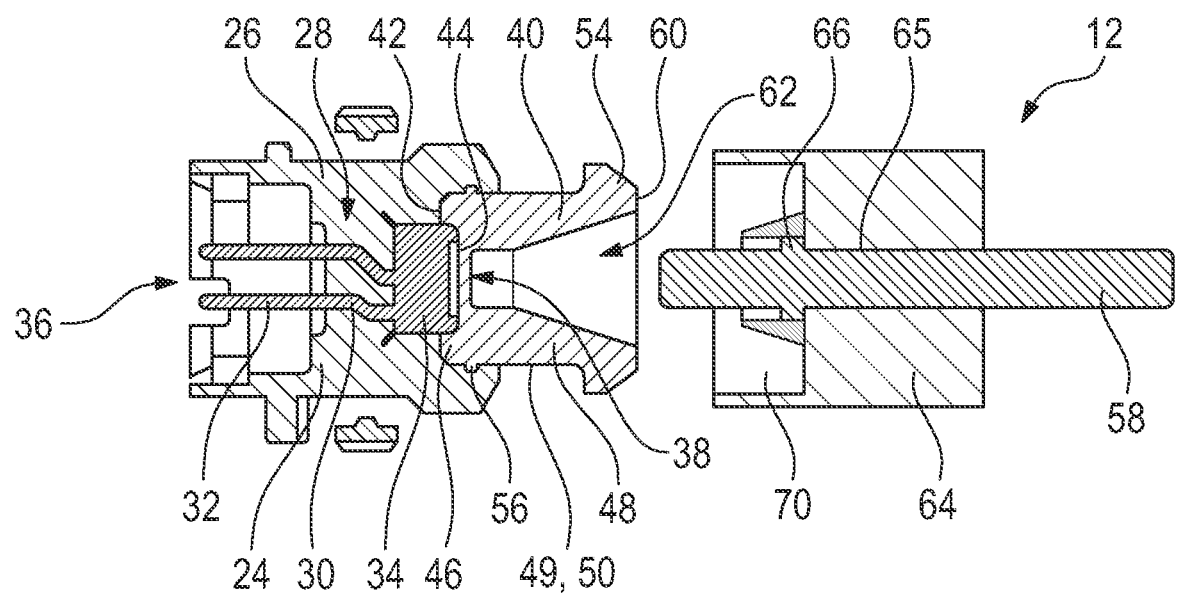
FIG. 4 shows holding device according to the invention of FIGS. 1 to 3.

FIG. 4 illustrates the holding device 12 of FIGS. 1 to 3 in a detail view, namely in the non-triggered unreinforced state.

The holding device 12 comprises a pyrotechnical actuator assembly 24 for holding and, in terms of signals, specifically releasing the tensioning means 14.

The actuator assembly 24 comprises a plastic base 26 as well as a pyrotechnical unit 28 including an igniter 30.

The igniter 30 has electric wires 32 and an ignition head 34, cf. FIG. 4. In the ignition head 34, a propelling charge is contained so that a propellant is generated by triggering the igniter 30.

The pyrotechnical unit 28 is received and held in the plastic base 26. In particular, the plastic material forming the plastic base 26 is injection-molded at least partially around the pyrotechnical unit 28.

The pyrotechnical unit 28 has a rear side 36 and an opposite front side 38. The igniter may be electrically contacted on its rear side 36.

Further, the actuator assembly 24 includes a tensioning means holder 40 which is directly adjacent at least to the front side 38 of the pyrotechnical unit 28 and covers the same. More precisely, the tensioning means holder 40 is adjacent to the ignition head 34, namely in an area where the plastic material forming the plastic base 26 is not injection-molded around the ignition head 34.

The tensioning means holder 40 specifically constitutes a cap.

The tensioning means holder 40 includes, on its end face 42 facing the pyrotechnical unit 28, a recess 44 complementary to the pyrotechnical unit 28 in which a portion of the ignition head 34 of the pyrotechnical unit 28 is received.

Thus, the pyrotechnical unit 28 excluding its electric wires 32 is contacted completely by the plastic base 26 and the tensioning means holder 40.

The tensioning means holder 40 can be made of plastic material or of metal. The tensioning means holder 40 illustrated in FIGS. 1 to 4 is specifically a tensioning means holder 40 made of plastic material.

In order to enable the tensioning means 14 to be released, the tensioning means holder 40 is detachably supported on the plastic base 26 in such a way that, by triggering the igniter 30, the tensioning means holder detaches as a unit completely from the plastic base 26.

More precisely, the tensioning means holder 40 is supported on the plastic base 26 by the plastic material forming the plastic base 26 being injection-molded around the tensioning means holder 40, specifically being injection-molded partially on the outside, in the area of its longitudinal end associated with the pyrotechnical unit 28.

By the injection-molding, the tensioning means holder 40 is held frictionally and/or non-positively in the plastic base 26.

In particular, the tensioning means holder 40 is partially injection-molded in the plastic base 26 and the plastic base 26 is configured so that the plastic base 26 remains free of cracks when the pyrotechnical means 28 is activated.

It is also conceivable, however, that the tensioning means holder 40 is inserted later into the plastic base 26.

The portion of the tensioning means holder 40 which is accommodated in the plastic base 26 forms a fastening portion 46.

An area of the tensioning means holder 40 which is not surrounded by injection-molding is a holding portion 48 for the tensioning means 14. A contact face 49 for the tensioning means 14 is provided on said holding portion 48.

The holding portion 48 is directly connected to the fastening portion 46.

The fastening portion 46 and the holding portion 48 together form a cylindrical surface 50 on the outside. Accordingly, when triggering the holding device 12, the tensioning means 14 can easily slip off the tensioning means holder 40.

In order to retain the tensioning means 14 on the holding device 12, a loop 52 is formed at an end portion 51 of the tensioning means 14 which is not fastened to the airbag 18 (see FIGS. 1 and 2).

In the non-triggered state of the holding device 12, the loop 52 is laid around the tensioning means holder 40, as illustrated in FIGS. 1 and 2, specifically around the holding portion 48 of the tensioning means holder 40.

In order to prevent the tensioning means 14 from slipping off the holding portion 48 when the holding device 12 is not triggered, a laterally projecting collar 54 which is widened compared the holding portion 48 is connected to an end of the holding portion 48 facing away from the fastening portion 46.

For increasing a retaining force acting on the tensioning means holder 40, the tensioning means holder 40 can include a radially outward projection 56 when viewed in the longitudinal direction of the holding device 12 at its portion received in the plastic base 26, i.e., in the fastening portion 46. In this way, the tensioning means holder 40 is held not only frictionally but also positively in the plastic base 26.

The projection 56 is preferably configured to be peripheral.

As an alternative, the tensioning means holder 40 can have a radially inwardly protruding recess which, for convenience, is not shown in the Figures. The recess can also be peripheral.

The holding device 12 further comprises a reinforcing element 58 which serves to increase the stability of the tensioning means holder 40.

For this purpose, the reinforcing element 58 is supported to be axially movable between a first position shown in FIG. 2 and a second position shown in FIG. 1. More precisely, the reinforcing element 58 is movable along a longitudinal axis of the holding device 12.

In the second position, the reinforcing element 58 is disengaged from the tensioning means holder 40 and, in a first position, the reinforcing element 58 is at least partially received, as shown in FIG. 2, in the tensioning means holder 40 and reinforces the latter mechanically. In the reinforced state, the holding device 12 can absorb transverse forces of more than 2.5 kN, specifically more than 5 kN, for example.

For receiving the reinforcing element 58, the tensioning means holder 40 includes a recess 62 at an end face 60 facing away from the plastic base 26 in which recess the reinforcing element 58 is at least partially received positively and/or frictionally in its first position.

When a load is applied, the tensioning means holder 40 can consequently bear on the reinforcing element 58.

According to the embodiment illustrated in FIGS. 1 to 4, the holding device 12 has a fixed bearing 64 which is arranged spaced apart from the tensioning means holder 40.

The reinforcing element 58 is received to be axially movable in the fixed bearing 64. In particular, the reinforcing element 58 is held frictionally in the bearing 64 so that the reinforcing element 58 cannot slip inadvertently within the bearing.

For this purpose, the bearing 64 has a bore 65 in which the reinforcing element 58 is inserted.

The reinforcing element 58 can be displaced preferably manually within the bearing 64.

In order to limit displacement of the reinforcing element 58, the reinforcing element 58 includes a stop 66 disposed spaced apart from the ends of the reinforcing element.

The stop 66 is a peripheral collar, for example. Alternatively, the stop 66 may include one or more lateral projections.

In its second position, the reinforcing element 58 abuts against the bearing 64 with the stop 66.

The reinforcing element 58 is, for example, an oblong ram, specifically made of plastic material or metal.

Hereinafter, with reference to FIGS. 1 to 4, a triggering of the airbag module 10 as well as of the holding device 12 will be described.

When the airbag module 10 is triggered, the airbag 18 is inflated.

As long as the holding device 12 is not triggered, the airbag 18 can deploy only to a restricted extent, however, as the tensioning means 14 prevents the airbag 18 from completely deploying.

It depends on a sitting position of a vehicle occupant whether the holding device 12 is triggered and, consequently, the tensioning means 14 is released.

If a vehicle occupant is sitting further distant from an instrument panel or if the vehicle occupant is in a reclined position, a higher airbag volume is required than in a sitting position close to the instrument panel.

If a larger airbag volume is required, the tensioning means 14 is released. This is done by igniting the pyrotechnical unit 28 as illustrated in FIG. 3.

By the ignition, a propelling gas is generated by means of the propellant contained in the ignition head 34, whereby a force is applied to the tensioning means holder 40 and the latter is detached from the plastic base 26.

In particular, the tensioning means holder 40 is completely detached from the plastic base 26 so that no remainder of the tensioning means holder 40 is left on the plastic base 26. The plastic base 26 remains free of cracks.

Hence, the tensioning means 14 may slip off the tensioning means holder 40 and is no longer retained by the holding device 12.

The airbag 18 can thus deploy unhindered.

When the holding device 12 is triggered, the bearing 64 serves as a catching device for the tensioning means holder 40.

For this purpose, the bearing 64 has a recess 70 for receiving the tensioning means holder 40 at an end face 68 facing the tensioning means holder 40. Hence, the tensioning means holder 40 is held on the holding device 12 even after the holding device 12 is triggered.

Figure 5:
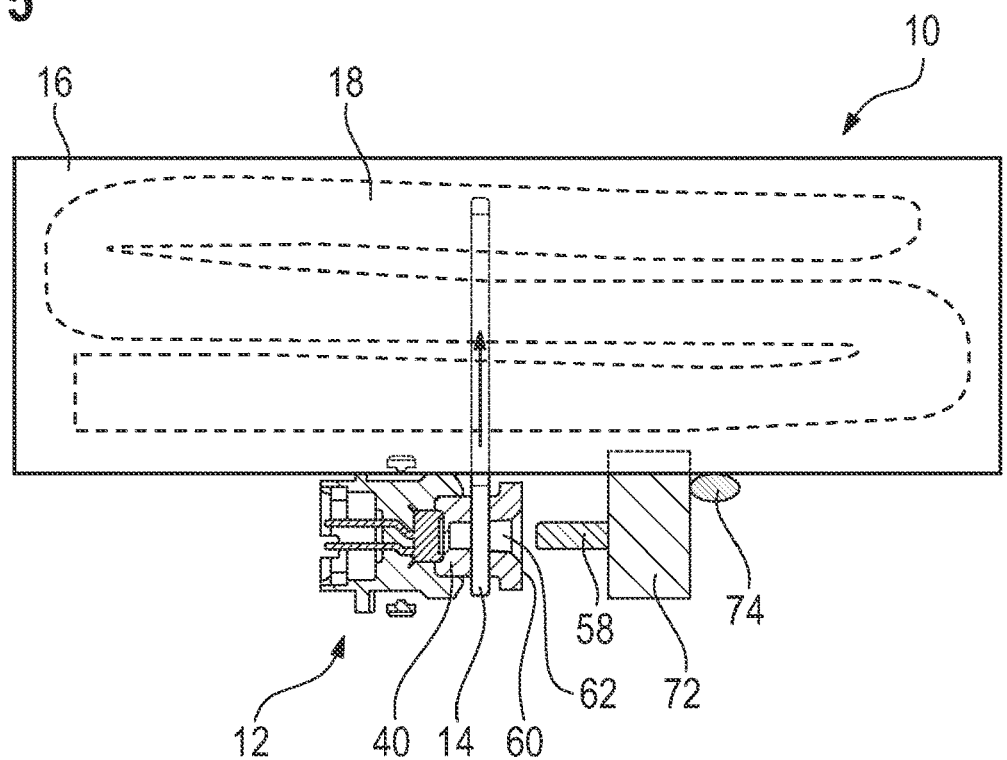
FIG. 5 shows another airbag module according to the invention comprising a holding device according to the invention in a non-triggered unreinforced state.
Figure 6:
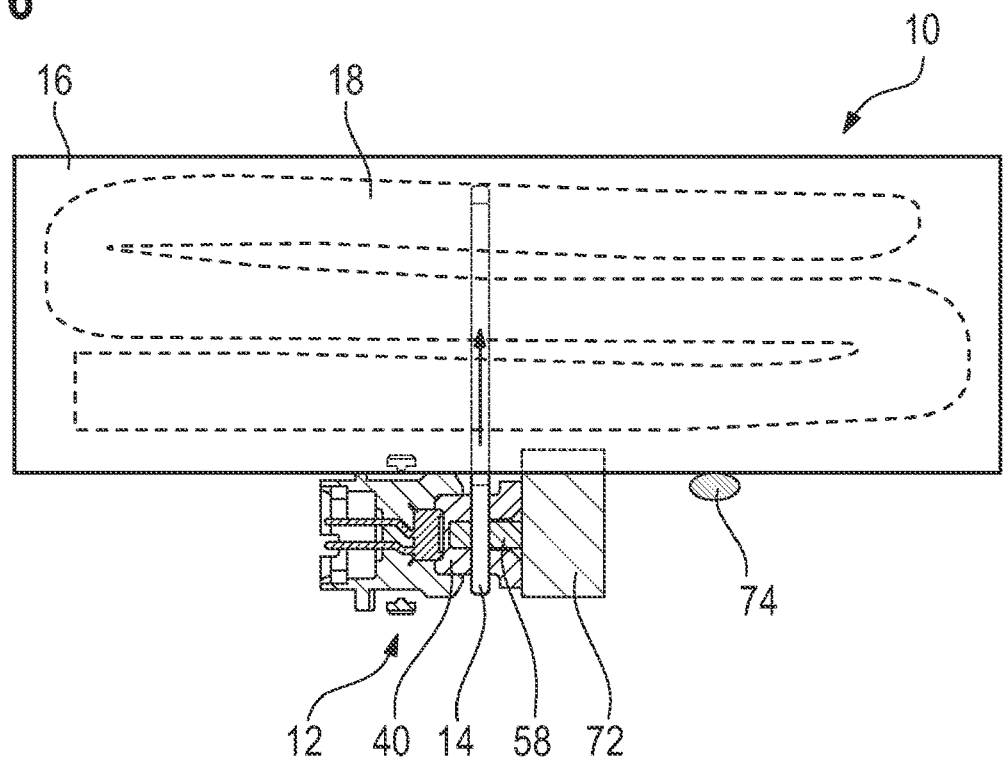
FIG. 6 shows the airbag module of FIG. 4, with the holding device being in a non-triggered reinforced state.
Figure 7:
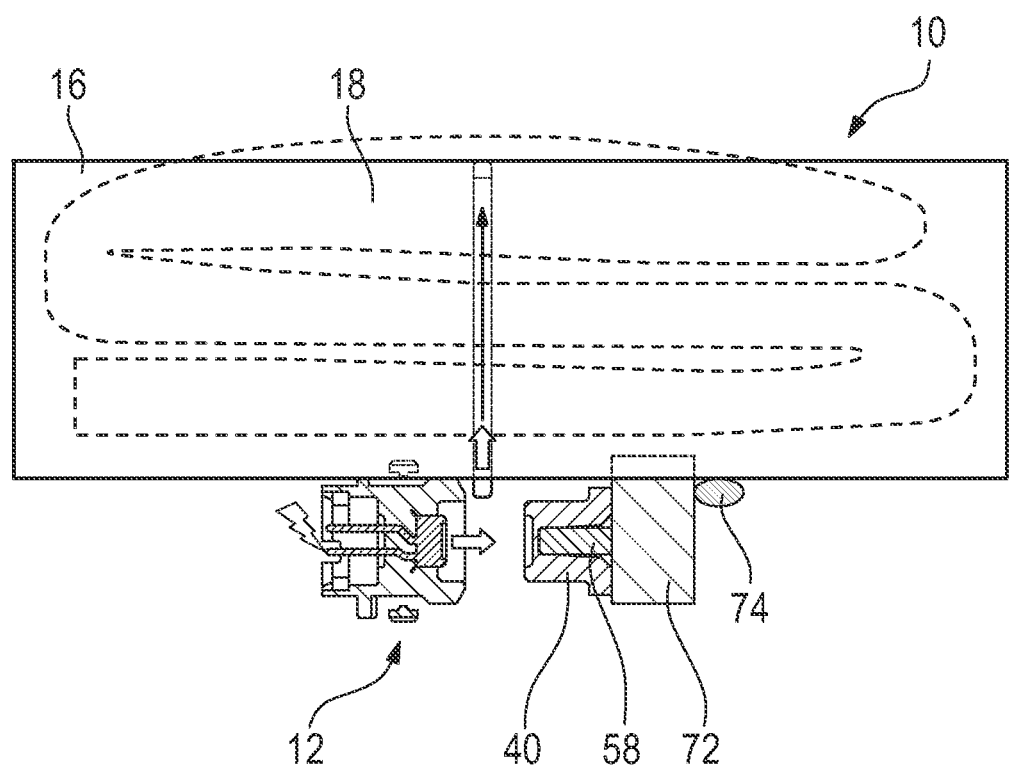
FIG. 7 shows the airbag module of FIGS. 4 and 5, with the holding device being triggered.

The FIGS. 5 to 7 illustrate a further embodiment of the airbag module 10.

FIG. 5 illustrates the airbag module 10 comprising a holding device 12, wherein the holding device 12 is not reinforced. In FIG. 6, the holding device 12 is shown in a reinforced state. FIG. 7 illustrates the holding device 12 in a triggered state.

The airbag module 10 shown in FIGS. 5 to 7 differs from the airbag module 10 shown in FIGS. 1 to 3 by the shape of the reinforcing element 58 as well as by the bearing of the reinforcing element 58.

The reinforcing element 58 according to FIGS. 5 to 7 is tightly fixed specifically to a linearly movable bearing part 72. Thus, the bearing part 72 moves along with the reinforcing element 58 from the first to the second position.

In order to enable the displacement of the bearing part 72, the movable bearing part 72 is frictionally guided in a linear guide. The bearing part 72 can preferably be displaced manually.

For example, the linear guide is formed in the airbag case 16. The linear guide may be designed as a dovetail guide, for example.

In addition, there is provided a stop element 74 that delimits displacement of the bearing part 72 in a direction away from the plastic base 26. The stop element 74 is also disposed on the airbag case 16.

The invention claimed is:

1. A holding device for holding and releasing a tether of an airbag of a vehicle safety system, comprising:
   a pyrotechnical actuator assembly for holding the tether, the actuator assembly being actuatable to release the tether, wherein the actuator assembly comprises a plastic base in which a pyrotechnical unit including a propelling charge and an igniter is accommodated and held, wherein the pyrotechnical unit has a rear side and an opposite front side,
   a tether holder which is adjacent to the front side of the pyrotechnical unit and covers the same and which is detachably supported on the plastic base, the tether holder being configured to retain the tether in an unactuated state of the actuator assembly, and
   a reinforcing element which is supported to be axially movable between a first position and a second position, wherein the reinforcing element in the second position is disengaged from the tether holder and in the first position is at least partially received in the tether holder and mechanically reinforces the tether holder.

2. The holding device according to claim 1, wherein the tether holder has a recess at an end face facing away from the plastic base in which recess the reinforcing element is at least partially received positively and/or frictionally in its first position.

3. The holding device according to claim 1, wherein the holding device has a fixed bearing which is arranged spaced apart from the tether holder, and the reinforcing element is received to be axially movable in the fixed bearing.

4. The holding device according to claim 3, wherein the reinforcing element has a stop arranged spaced apart from the ends of the reinforcing element, and the reinforcing element in its second position abuts against the bearing with the stop.

5. The holding device according to claim 3, wherein the bearing includes a recess for receiving the tether holder at an end face facing the tether holder.

6. The holding device according to claim 3, wherein the reinforcing element is held frictionally within the bearing.

7. The holding device according to claim 1, wherein the reinforcing element is tightly fixed to a linearly movable bearing part.

8. The holding device according to claim 7, wherein the movable bearing part is frictionally guided in a linear guide.

9. The holding device according to claim 7, wherein a stop element is provided which delimits a displacement of the bearing part in a direction away from the plastic base.

10. The holding device according to claim 1, wherein the reinforcing element is an oblong ram.

11. An airbag module for a vehicle safety system comprising an airbag, an airbag case in which the airbag is accommodated, comprising a holding device according to claim 1 which is fastened to the airbag case, and comprising a tether which is fastened to the airbag and is held on the holding device.

12. The airbag module according to claim 11, wherein a loop is formed on an end portion of the tether which is not fastened to the airbag, wherein the loop is laid around the tether holder, specifically around the holding portion of the tether holder, in the non-triggered state of the holding device.

* * * * *